United States Patent [19]

Schievelbein et al.

[11] Patent Number: 5,141,536

[45] Date of Patent: Aug. 25, 1992

[54] GLYCOL DEHYDRATION APPARATUS FOR NATURAL GAS

[75] Inventors: Vernon H. Schievelbein, Houston, Tex.; Thomas J. Piglia, Sr., New Orleans, La.

[73] Assignee: Texaco Inc., White Plains, N.Y.

[21] Appl. No.: 800,318

[22] Filed: Nov. 29, 1991

[51] Int. Cl.⁵ .............................................. B01D 19/00
[52] U.S. Cl. ........................................ 55/208; 55/32; 202/180
[58] Field of Search ............................ 55/32, 31, 208; 202/180, 188

[56] References Cited

U.S. PATENT DOCUMENTS 5,084,074  1/1992  Beer et al. ................................ 55/32

*Primary Examiner*—Bernard Nozick
*Attorney, Agent, or Firm*—Jack H. Park; Kenneth R. Priem; Harold J. Delhommer

[57] ABSTRACT

An improved glycol dehydration apparatus with a condenser on the reboiler water vapor vent to condense volatile carbon compounds, said condenser comprising a countercurrent flow shell-and-tube condenser with an annular space of at least three-quarters of an inch, said shell inlet in fluid communication with the glycol dehydration apparatus at a first location between the pressure reduction pump and the glycol reboiler and said shell outlet in fluid communication with the glycol dehydration apparatus at a second location between the glycol reboiler and the first location.

7 Claims, 1 Drawing Sheet

5,141,536

GLYCOL DEHYDRATION APPARATUS FOR NATURAL GAS

BACKGROUND OF THE INVENTION

This invention relates to an improvement in glycol dehydration apparatus used for drying natural gas. More particularly, the invention concerns the use of a shell-and-tube condenser on the water vapor vent of a glycol reboiler to remove volatile carbon compounds from the vent gas.

Processing of natural gas flowing from the wellhead is required to provide a uniformly lean, sweet and dry gas for industrial and consumer use. Processing facilities are usually located in or near natural gas fields and range in size from small wellhead installations to large plants.

Gas processing involves the use of a number of different processes, each designed to remove a different impurity. Impurities range from acid gases such as carbon dioxide, hydrogen sulfide, carbonyl sulfide and other sulfur compounds to water and higher homologues of methane such as ethane, propane and butane. The higher alkanes are separated out because of their greater value.

Water vapor, which is usually present in gas produced from underground formations, must be removed either by absorption by hydroscopic liquids or adsorption on beds of molecular sieves or activated solid dessicants. The most widely used water removal systems in the industry are those based on water adsorption by ethylene glycol, diethylene glycol or triethylene glycol. Diethylene glycol is the most widely used absorbent. The advantages of relatively low cost, ease of regeneration and operation, minimal losses of drying agent during operation, and thousands of glycol dehydration units in the field insure that glycol dehydration will continue to be the predominant means of water removal from natural gas in the future.

Glycol dehydration units consist of a contacting or absorber tower, a glycol reboiler to regenerate the glycol, a three-phase gas, glycol and condensate separator and a pressure reduction pump to reduce the pressure of the wet glycol before it moves to the glycol reboiler for regeneration. In the contactor tower, the wet gas stream comes into contact with the countercurrent flow of glycol. The pressure reduction pump reduces pressure of the wet glycol before it passes to the glycol reboiler or regenerator, where the water is distilled from the glycol. Most units then employ a three-phase gas and glycol condensate separator to recover some of the hydrocarbons from the glycol prior to drying the glycol in the glycol reboiler.

Recently, the natural gas industry has become aware that the water vapor vented from the stripping still of the glycol reboiler is rich in volatile carbon compounds, including toxics such as benzene, toluene, ethylbenzene and xylene, making the water vapor vent gas an air pollution source that must be curtailed. One solution to this pollution problem has been the use of forced draft condensers attached to the water vapor vent line for the purpose of condensing the hydrocarbons in the vent gas. Unfortunately, forced draft condensers are costly and have moving parts to create reliability problems. Electrical power is required and the condensers are sensitive to ambient air temperature. If the air temperature is hot, as frequently occurs in southern United States gas fields, the forced draft condensers will be unable to adequately condense the volatile carbon compounds in the water vapor vent gas.

A second solution that is being tried by industry as direct incineration. However, this solution is fraught with substantial technical and cost problems, not the least of which is heating large quantities of water. Natural draft condensers have been tried but are not very effective. Furthermore, they are large and relatively costly.

SUMMARY OF THE INVENTION

The invention is an improvement for glycol dehydration apparatus employed for drying natural gas in such apparatus containing a contactor tower for contacting glycol and wet gas, a glycol reboiler, and a pressure reduction pump for moving the wet glycol to the reboiler. The glycol reboiler vents water vapor containing a substantial quantity of volatile carbon compounds. The invention improves glycol dehydration apparatus by adding a shell-and-tube countercurrent condenser to condense the gaseous hydrocarbon in the water vapor vent gas.

The shell-and-tube condenser has two ends, at least one interior tube having an inlet and an outlet at opposite ends of the condenser for passage of the gaseous fluid to be condensed into, through and out of the interior tube, and a shell having an inlet and outlet at opposite ends of the condenser for passage of wet glycol into, through and out of annular space between the shell and the tube. The shell and the tube must be sized to provide an annular space of at least three-quarters of an inch between the shell and the tube. The shell inlet is located on the same end of the condenser as the tube outlet, and the shell outlet is located on the same end of the condenser as the tube inlet.

The tube inlet must be in fluid communication with the water vapor vent of the glycol reboiler. The tube outlet is in fluid communication with a liquid sump and an atmospheric vent. The shell inlet is in fluid communication with the glycol dehydration apparatus at a first location between the pressure reduction pump and the glycol reboiler. The shell outlet is in fluid communication with the glycol dehydration apparatus at a second location between the glycol reboiler and the first location. The apparatus further comprises a means for transporting wet glycol to the shell inlet from the first location and a means for transporting wet glycol that has picked up heat from the water vapor vent gas from the shell outlet to the second location.

DETAILED DESCRIPTION

Figure 1:
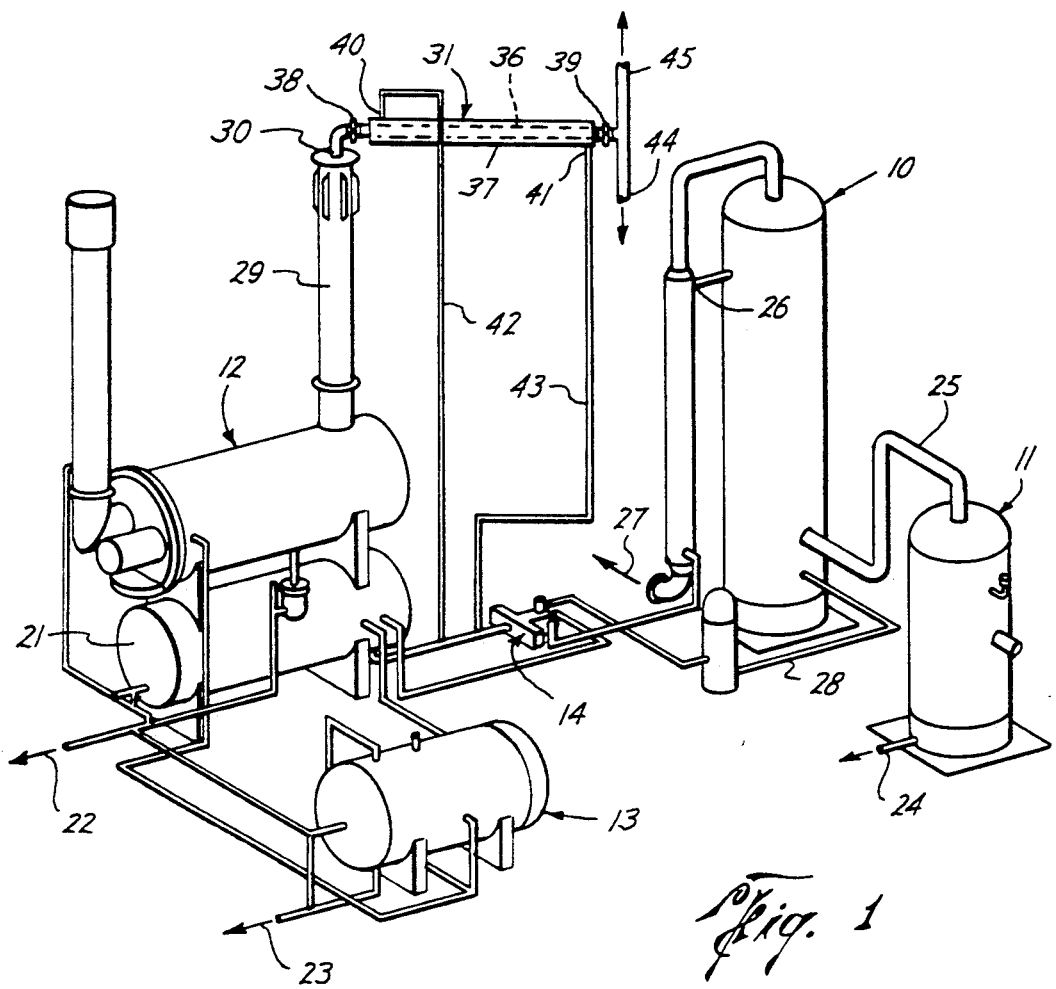
FIG. 1 is an illustration of a typical glycol dehydration apparatus showing the condenser improvement attached to the water vapor vent of the glycol reboiler.
Figure 2:
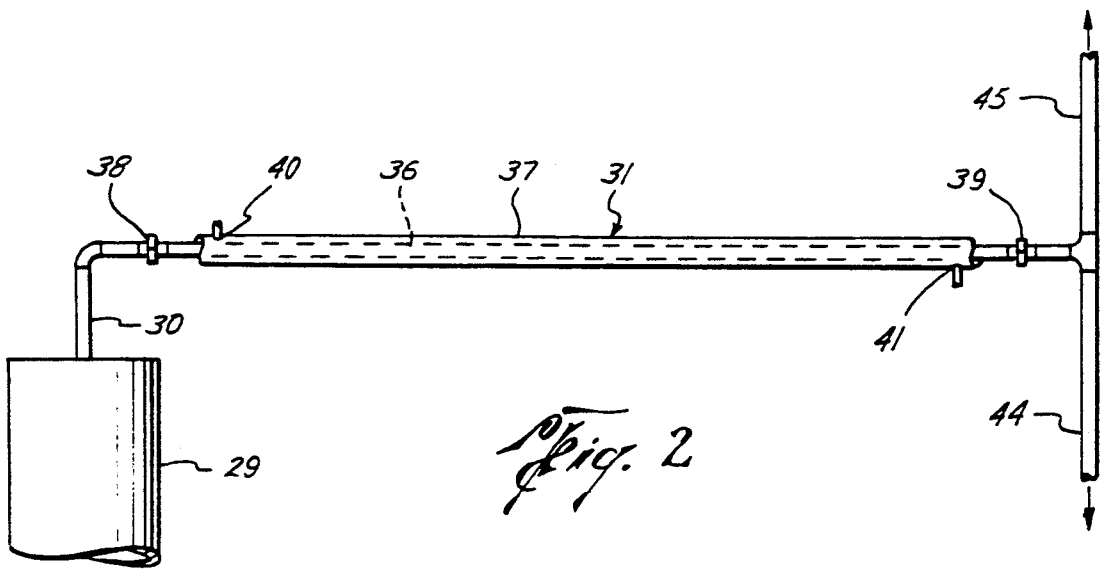
FIG. 2 is an enlarged view of the condenser.

FIGS. 1 and 2 illustrate a typical glycol dehydration apparatus and invention condenser attached to the water vapor vent of the glycol reboiler. In FIG. 1, the glycol dehydration apparatus contains several subunits: Contactor tower 10, inlet scrubber 11, glycol reboiler 12, three-phase gas, glycol and condensate separator 13, and pressure reduction pump 14. Other items shown in FIG. 1 are the heat exchanger surge tank 21, the excess separated gas outlet 22 from the surge tank 21, condensate outlet 23 from the separator 13, condensate outlet 24 from the inlet scrubber 11, wet gas to contactor line 25, dry glycol inlet 26 to furnish dry glycol to the countercurrent contactor tower 10, dry gas outlet 27 from the contactor tower, wet glycol outlet 28 from the contactor tower, stripping still 29 of the glycol reboiler 12, and water vapor vent 30 of the glycol reboiler 12.

The invention condenser is indicated at 31 and contains interior tube 36, shell 37, interior tube inlet 38, interior tube outlet 39, shell outlet 40, shell inlet 41, means for transporting wet glycol from the shell outlet to second location 42, means for transporting wet glycol to the shell inlet from first location 43, tube outlet to liquid sump 44, and atmospheric vent 45.

In operation, the apparatus improvement picks up wet glycol that has been reduced in pressure from the low pressure side of the pressure reduction pump 14. The means of transporting the wet glycol 43 moves the glycol to the shell inlet 41. The glycol moves through the annular space between the shell 37 and tube 36, exits from the shell-and-tube condenser at shell outlet 40, and moves through means for transporting the wet glycol 42 back to the low pressure side of the pressure reduction pump.

At the same time, the carbon compound containing water vapor exits the water vapor vent 30 and passes into the interior tube 36 at tube inlet 38. Most of the carbon compounds and water vapor are condensed within the tube 36 prior to exiting the tube outlet 39. At this point, the condensed hydrocarbons and water drop down to the liquid sump through tube outlet 39 to liquid sump 44, while remaining vapors pass upward through atmospheric vent 45.

Preferably, the end of the condenser with the tube inlet and shell outlet is located higher relative to the ground than the end of the condenser with the tube outlet and shell inlet. Such a position provides a downward gradient for passage of condensed liquids out of the interior tube and the tube outlet. Preferably the shell inlet is located on the bottom of the shell and shell outlet is located on the top of the shell. The combination of the preferred downward gradient of the condenser and location of the shell inlet and outlet aids in gas separation from the wet glycol foam and in combination with the required annular space, permits contact of more liquid glycol with the interior tube.

It was decided to use the wet glycol returning from the contactor tower as the cooling media. If allowance is made for the gas breakout from the wet glycol foam, the foam provides an excellent condenser fluid. But because the wet glycol is present as a foam the design of the shell-and-tube condenser had to be changed in a direction completely opposite to that taught by the art.

It is well-known in the heat exchanger art that a liquid will transfer heat better than a gas. It is also well-known that turbulent flow will better move heat away from an exchanger wall to be dissipated in a cooling media. Thus, a higher velocity flow of cooling media is desirable to create turbulent flow. This is most often done by shrinking the annular space in a shell-and-tube condenser, and optionally, installing baffles in the annular space.

Because of these two principles of heat transfer, the art teaches that a shell-and-tube condenser to solve the invention problem would have an annular space of a smaller diameter than that required by the invention. This would ensure liquid contact of the wet glycol was achieved with the interior tube and ensure turbulent flow for better heat transfer. Logic and the art teaches that a smaller annular space results in a higher Reynolds number and greater turbulent flow. According to the art, an increase in annular space increases laminar flow with a subsequent decrease in heat transfer.

However, with the use of wet glycol foam from the low pressure side of a pressure reduction pump, we have found that the reverse of the prior art teachings is correct. Instead of using a small annular space as taught by the prior art, we have discovered that the annular space should be at least three quarters of an inch or greater, more preferably one inch or greater.

We believe that our unexpected success with this non-standard heat exchange apparatus is based upon the wet glycol foam. The cooling glycol forms a foam after pressure reduction and enters the condenser with considerable and entrained gas. Because the cool glycol foam is viscous, the foam breaks slowly. As the glycol warms, it loses viscosity and the foam breaks more rapidly. As the liquid glycol contacts the wall it is further warmed, releasing additional entrained gas. The release of the additional dissolved gas as well as the gas from the foam provides turbulence, obviating the need for turbulent flow to be provided by a high Reynolds number.

With a small annular space, there is probably not enough space for sufficient gas release and turbulent action to achieve effective heat transfer in the annular space. Second, with so much gas dissolved in the rich glycol and entrained in the foam, the smaller annular space taught by the art may cause the released gas on the top and the bottom to form an insulating layer preventing adequate contact between the liquid glycol and the interior tube.

The invention condenser should have a length between about 7 feet and about 40 feet. Flow velocities for wet glycol coolant should be between about 12 and about 500 gallons per hour. Flow rate for water vapor and hydrocarbons should be between about 0.2 and about 10 cubic feet per minute. The wet glycol foam will typically be supplied to the condenser at a temperature between about 70° and about 110° F., and returned from the condenser about 120° to about 160° F. hotter.

A substantial number of glycol dehydration units in the field lack a three phase separator. Consequently, large quantities of hydrocarbons enter the atmosphere from the water vapor vent of the glycol reboiler. The use of the invention condenser on such units may not condense all hydrocarbons exiting the vapor vent of the reboiler, leaving such units in some cases in violation of air pollution laws. But the invention apparatus will condense most of the water vapor leaving a burnable exit stream that can be routed to the reboiler for fuel or to an incinerator.

In summary, we believe the invention condenser works effectively for several reasons. First, the low pressure glycol foam is an effective cooling media which provides turbulent flow by a gas liberation mechanism. Second, the large diameter shell which provides for a larger than normal annular space permits turbulent flow by gas liberation without a high Reynolds number. Third, positioning the condenser to allow for a slight downward gradient for the gaseous hydrocarbons to be condensed, as opposed to a vertical or horizontal positioning, allows gas that is liberated from the glycol foam to rise above the tube and move out of the condenser along a path at the upper part of the shell, allowing extra glycol liquid to collect near the shell inlet and provide greater liquid contact with the tube.

The following examples will further illustrate the novel invention improvement to glycol dehydration apparatus for condensing volatile carbon compounds within vented water vapor. These examples are given by way of illustration and not as limitations on the scope of the invention. Thus, it should be understood that the condenser may be varied to achieve similar results within the scope of the invention.

EXAMPLES

The art teaches that a condenser to solve the invention problem should have a maximum annular space of about 0.3 to 0.35 inches. The art also teaches that an annular space diameter smaller than 0.3 inches would provide better heat transfer and be more effective. Practice has shown that exactly the opposite is true. An annular space diameter of at least three quarters of an inch or greater is required, and preferably, the annular space should be one inch or greater.

BAYOU SALE GLYCOL DEHYDRATION UNIT

A condenser designed according to the present invention but having insufficient annular space was placed on the water vapor vent of a glycol reboiler of a dehydration unit and the Bayou Sale field. This experimental condenser was 17 feet long and constructed from Schedule 40 tubing with a 2 inch interior tube and a 3 inch outer shell. Wet glycol was displaced through the outer shell and served as the cooling media for the vapor in the inner tube.

The glycol dehydration unit was processing 31.7 MMCFD of gas with a 270 gal/hr glycol circulation rate. The flash separator was operating at 225° F. and 80 psig.

A preliminary inspection revealed that the unit was condensing hydrocarbons from the reboiler water vapor vent. However, vapors were still leaving the vent downstream of the condenser.

To quantify the recovery of volatile carbon compounds, the rate at which water and hydrocarbon were being accumulated by the condenser was measured. This was done by detaching the liquid drain line from the sump tank and letting the liquid drain into a carboy. Liquid was collected during several complete reboiler heating cycles. During this 28 minute cycle, 0.8 gallons of hydrocarbon and 1.6 gallons of water were collected. The hydrocarbon collection rate extrapolated to 41 gallons per day.

Lean and rich glycol samples were collected to determine the rate at which volatile carbon compounds were entering the condenser. These samples were analyzed using a purge and trap gas chromatography method. The concentrations and emission rates ar noted below in Table 1.

TABLE 1

| BAYOU SALE - 3 INCH CONDENSER SHELL (HALF INCH ANNULAR SPACE) | | | |
|---|---|---|---|
| | RICH | LEAN | REBOILER VAPOR |
| | GLYCOL, PPM | GLYCOL, PPM | TONS/ YEAR | GAL/ DAY |
| Benzene | 1019 | 19 | 11.0 | 8.3 |
| Toluene | 1781 | 52 | 19.3 | 14.5 |
| Ethylbenzene | 246 | 13 | 2.6 | 0.4 |
| m,p-Xylene | 1123 | 52 | 11.9 | 9.1 |
| o-Xylene | 526 | 43 | 5.4 | 4.0 |
| Total BTEX[1] | 4695 | 179 | 50.2 | 36.3 |

TABLE 1-continued

| BAYOU SALE - 3 INCH CONDENSER SHELL (HALF INCH ANNULAR SPACE) | | | |
|---|---|---|---|
| | RICH | LEAN | REBOILER VAPOR |
| | GLYCOL, PPM | GLYCOL, PPM | TONS/ YEAR | GAL/ DAY |
| Total VOC[2] | 6188 | 539 | 62.9 | 48.5 |

[1]BTEX is an acronym for benzene, toluene, ethylbenzene, xylene.
[2]VOC is an acronym for volatile carbon compounds The recovery efficiency achieved with this condenser having a half inch annular space was calculated to be 41/48.5 or 85%. But as discussed below in the test on the A. Broussard glycol reboiler condenser, the 85% recovery value is probably about 10% higher than the actual recovery figure. Thus, recovery efficiency for this condenser should be about 75%.

A. BROUSSARD GLYCOL DEHYDRATION UNIT

A condenser was installed at the A. Broussard #1 well following the same design as the previously tested Bayou Sale condenser except that the outer jacket diameter was increased to 4 inches, providing for an annular space diameter of 1 inch. This dehydration unit was processing 3.5 MMCFD of gas with a 56 gal/hr glycol circulation rate. The flash separator was operating at 186° F. and 70 psig.

A visual inspection revealed the unit was condensing nearly all of the hydrocarbons from the reboiler vapor. A touch test indicated that the exiting vapor was nearly the same temperature as the incoming glycol, leading to the conclusion that the condenser was providing the desired heat exchange.

To quantify the efficiency of recovery, the procedure previously used for the Bayou Sale condenser was employed except that the rate at which uncondensed gas was leaving the condenser was measured and the concentration of the volatile carbon compounds in the gas was measured.

The rate of condensation of water and hydrocarbon was measured over a 2 hour period. The hydrocarbon collection rate was then extrapolated to yield 26.5 gallons per day of hydrocarbons. The results of the analyses are listed below in Table 2.

TABLE 2

| A. BROUSSARD - 4 INCH CONDENSER (ONE INCH ANNULAR SPACE) | | | |
|---|---|---|---|
| | RICH | LEAN | REBOILER VAPOR |
| | GLYCOL, PPM | GLYCOL, PPM | TONS/ YEAR | GAL/ DAY |
| Benzene | 5543 | 688 | 11.3 | 8.4 |
| Toluene | 5342 | 925 | 10.2 | 7.7 |
| Ethylbenzene | 403 | 155 | 0.6 | 0.4 |
| m,p-Xylene | 2153 | 580 | 3.7 | 2.8 |
| o-Xylene | 1081 | 353 | 1.7 | 1.2 |
| Total BTEX | 17273 | 2701 | 27.5 | 20.5 |
| Total VOC | 21991 | 5762 | 31.5 | 24.3 |

Our recovery efficiency calculated from material balance values and liquid collection measurement was 26.5/24.3 or 109%. The recovery of over 100% can be attributed to hydrocarbon loss during glycol sampling. To get a more accurate measurement of the hydrocarbon emission rate, the condenser drain line was plugged and all noncondensed gas was vented to an empty autoclave bag. The bag was sealed around the end of the vent and allowed to expand as it collected the noncondensed gas. Collection was started at the beginning of a burner cycle and stopped at the end of the burn cycle. The process was repeated while the burner was off although gas flow ceased. Since the condenser had cooled the gas to ambient temperature prior to bag entry, volume changes due to temperature changes were not a factor. The observation that gas flow is intermittent and has no appreciable pressure differential suggests that the fugitive emissions techniques employed earlier were the appropriate sampling technique.

During a 11.5 minute period of one complete burner cycle, 1.56 ft$^3$ of gas was collected. This collection rate extrapolates to 195 ft$^3$/day of gas. Gas chromatography analysis of the collected gas showed a total of 3.2 mol % of non-methane, non-ethane hydrocarbon components. Using an average molecular weight of 60, the emission loss was calculated to be:

$$0.032 \times 195 \text{ ft}^3/379 \text{ ft}^3/\text{lb mol} \times 60 \text{ lb/lb mol}/7.1 \text{ lbs/gas} = 1.4 \text{ gal/day}.$$

The recovery efficiency was:

$$100 - (1.4 \times 100/26.5 + 1.4) = 95\%.$$

SECOND BAYOU SALE GLYCOL DEHYDRATION UNIT

A second Bayou Sale dehydration unit glycol reboiler was fitted with a condenser having a 4 inch exterior shell and a 2 inch interior tube. The second reboiler provided 750,000 BTU/hour to recycle the glycol for processing 37 MMCFD of gas with a 265 gal/hr glycol circulation rate. The flash separator was operating at 240° F. and 62 psig.

The liquid drain line was detached from the sump tank allowing the liquid to drain into a carboy. During a 30 minute interval, 6.49 liters of hydrocarbon and 11.76 liters of water were collected. This hydrocarbon collection rate extrapolated to 82.3 gallons per day.

Glycol samples were collected to determine the rate at which volatile carbon compound vapors were entering the condenser. Gas that evolved in the three-phase separator was being recovered and not vented to the atmosphere. Therefore, a glycol sample was taken from the glycol stream as it left the three-phase separator prior to entry into the reboiler. The glycol at this point was at 240° F., about 60° F. hotter than it was prior to installation of the invention glycol cooled condenser. To prevent hydrocarbon vaporization from the hot glycol, a side stream was passed through a cooling coil before pressure was released. This sample and a sample of the glycol leaving the reboiler were analyzed using a purge and trap gas chromatography method.

The concentration and the emission rates calculated by material balances are indicated below in Table 3.

TABLE 3

| BAYOU SALE - FOUR INCH CONDENSER SHELL (HALF INCH ANNULAR SPACE) | | | |
|---|---|---|---|
| SEPARA- TOR GLY- COL.PPM | LEAN GLYCOL. PPM | REBOILER VAPOR TONS/ YEAR | GAL/ DAY |
| Benzene 1798 | 20 | 19.4 | 14.5 |
| Toluene 3548 | 75 | 37.9 | 28.7 |
| Ethylbenzene 196 | 8 | 2.1 | 1.6 |
| m,p-Xylene 2356 | 96 | 24.7 | 18.8 |
| o-Xylene 926 | 73 | 9.3 | 7.0 |
| Total BTEX 8824 | 272 | 93.4 | 70.6 |

TABLE 3-continued

| BAYOU SALE - FOUR INCH CONDENSER SHELL (HALF INCH ANNULAR SPACE) | | | |
|---|---|---|---|
| SEPARA- TOR GLY- COL.PPM | LEAN GLYCOL. PPM | REBOILER VAPOR TONS/ YEAR | GAL/ DAY |
| Total VOC 10103 | 459 | 105.4 | 81.3 |

The calculated recovery efficiency achieved with the invention condenser was 82.3/81.3 or 101.2%. The recovery of over 100% is attributed to inaccuracies in determining the glycol pump rate or losses of hydrocarbon from the glycol while sampling and shipping for later analysis.

Consistent with the material balance calculation was visible observation of only a small amount of gas leaving the condenser atmospheric vent. A small puff occurred when the burner went to high heat and flow would gradually taper off as the high burn continued for about 12 minutes. No gas left the vent pipe when the burner was on low burn during its 3.5 minute duration.

As a second check on the emissions level, the autoclave bag procedure of the A. Broussard reboiler condenser was followed. First, the condenser liquid drain line was plugged at its end to force gases out of the vent line. Liquid hydrocarbon was allowed to accumulate in the drain line volume ahead of the plug. An autoclave bag was sealed around the end of the vent and allowed to expand as it collected gas. Collection was started at the beginning of the high head of the burner cycle and continued for 3 minutes and 25 seconds until the first bag was nearly full. A second sample was collected over 10.5 minute interval of another burner cycle. That collection started 2 minutes after the burner went to high heat and continued into the low burn period.

The volume collected in each bag was approximately 1.5 ft$^3$. From these measurements over the defined parts of the burner cycle, the gas volume was calculated to be 312 ft$^3$ per day. In addition, approximately 60 ml of liquid condensed in the bags. This liquid was a 1:3 mixture of hydrocarbon and water. With the assumption that the average molecular weight is 60, the equivalent gaseous volume of the condensed hydrocarbon was calculated to be:

$$0.06 \text{ liters} \times 0.33/22.4 \text{ liters/mol} \times 0.83$$
$$\text{kg/liter}/0.060 \text{ kg/mole} \times 298/273 \times 0.035 \text{ ft}^3\text{liter}$$
$$= 0/023 \text{ ft}^3$$

Our GC analysis of the two gas samples showed an average of 3.1% non-methane, non-ethane hydrocarbons. The VOC emission rate was the sum of the amount contained in the vapor and the amount condensed in the bag. The amount contained in the vapor was:

$$0.031 \times 312 \text{ ft}^3/\text{day} / 379 \text{ ft}^3/\text{lb mol} \times 60 \text{ lb/lb mol} =$$

$$1.53 \text{ lb/day or } 0.28 \text{ tons/year}$$

$$1.53 \text{ lb/day} / 7.1 \text{ lbs/gal} = 0.22 \text{ gal/day}$$

The liquid hydrocarbon recovery (as condensate in the collection bag) was equivalent to 0.94 gal/day. Consequently, 1.16 gallons per day or 1.5 tons/year of hydrocarbon was vented to the atmosphere.

The recovery efficiency was:

$$100 - (1.16 \times 100 / (82.3 - 1.16) = 98.6\%$$

Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

What is claimed is:

1. In a glycol dehydration apparatus for drying natural gas containing a contactor tower for contacting glycol and wet gas, a glycol reboiler, and a pressure reduction pump for moving the wet glycol to the reboiler, the improvement comprising:
   a shell-and-tube countercurrent condenser to condense gaseous hydrocarbons from a water vapor vent of the glycol reboiler,
   said shell-and-tube condenser having two ends, at least one interior tube having an inlet and an outlet at opposite ends of the condenser for passage of the gaseous fluid to be condensed into, through and out of the interior tube, and a shell having an inlet and an outlet at opposite ends of the condenser for passage of wet glycol into, through and out of an annular space between the shell-and-tube, said shell-and-tube sized to provide an annular space of at least three-quarters of an inch between the shell-and-tube,
   said shell inlet located on the same end of the condenser as said tube outlet and said shell outlet located on the same end of the condenser as said tube inlet,
   said tube inlet in fluid communication with the water vapor vent of the glycol reboiler, said tube outlet in fluid communication with a liquid sump and an atmospheric vent,
   said shell inlet in fluid communication with said glycol dehydration apparatus at a first location between the pressure reduction pump and the glycol reboiler, said shell outlet in fluid communication with said glycol dehydration apparatus at a second location between the glycol reboiler and said first location;
   a means for transporting wet glycol to the shell inlet from said first location; and
   a means for transporting wet glycol from the shell outlet to said second location.

2. The apparatus of claim 1, wherein the end of the condenser with the tube inlet and shell outlet is located higher relative to the ground than the end of the condenser with the tube outlet and shell inlet.

3. The apparatus of claim 1, wherein the shell inlet is located on the bottom of the shell and the shell outlet is located on the top of the shell.

4. The apparatus of claim 1, wherein the shell and the tube are sized to provide an annular space of at least one inch between the shell and the tube.

5. The apparatus of claim 1, further comprising baffles located within the annular space between the shell and the tube.

6. The apparatus of claim 1, wherein the shell-and-tube condenser is about 7 to about 40 feet long.

7. In a glycol dehydration apparatus for drying natural gas containing a contactor tower for contacting glycol and wet gas, a glycol reboiler, and a pressure reduction pump for moving the wet glycol to the reboiler, the improvement comprising:
   a shell-and-tube countercurrent condenser to condense gaseous hydrocarbons from a water vapor vent of the glycol reboiler,
   said shell-and-tube condenser having two ends, at least one interior tube having an inlet and an outlet at opposite ends of the condenser for passage of the gaseous fluid to be condensed into, through and out of the interior tube, and a shell having an inlet and an outlet at opposite ends of the condenser for passage of wet glycol into, through and out of an annular space between the shell and the tube, said shell and tube sized to provide an annular space of at least one inch between the shell and the tube,
   said shell inlet located on the bottom of the shell and the same end of the condenser as said tube outlet, said shell outlet located on the top of the shell and the same end of the condenser as said tube inlet,
   said end of the condenser with the tube inlet and shell outlet located higher relative to the ground than the end of the condenser with the tube outlet and shell inlet,
   said tube inlet in fluid communication with the water vapor vent of the glycol reboiler, said tube outlet in fluid communication with a liquid sump and an atmospheric vent,
   said shell inlet in fluid communication with said glycol dehydration apparatus at a first location between the pressure reduction pump and the glycol reboiler, said shell outlet in fluid communication with said glycol dehydration apparatus at a second location between the glycol reboiler and said first location;
   a means for transporting wet glycol to the shell inlet from said first location; and
   a means for transporting wet glycol from the shell outlet to said second location.

* * * * *